2 P
D. Williams.
Cook Stove.
A. I. No. 69.
A.I. Patented Mar. 26, 1844.
File 64
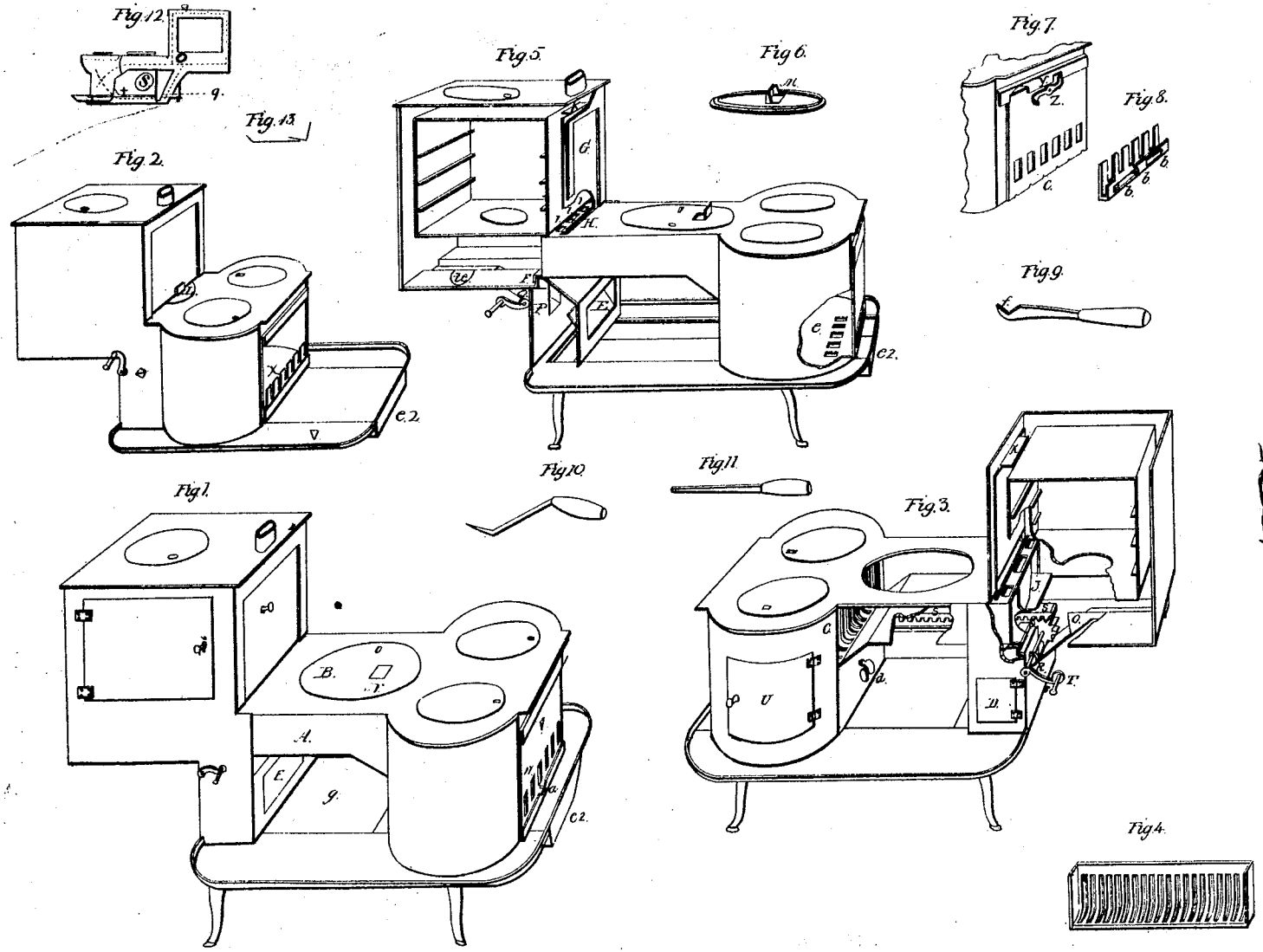
N. PETERS, PHOTO-LITHOGRAPHER, WASHINGTON, D. C.